(12) United States Patent
Mischler et al.

(10) Patent No.: US 7,810,539 B2
(45) Date of Patent: Oct. 12, 2010

(54) COMPACTION ROLLER FOR A FIBER PLACEMENT MACHINE

(75) Inventors: Peter L. Mischler, Rockton, IL (US); Mark Curtis Tingley, Hutsonville, IL (US); Klaus Hoffmann, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 1079 days.

(21) Appl. No.: 11/467,379

(22) Filed: Aug. 25, 2006

(65) Prior Publication Data

US 2007/0044922 A1    Mar. 1, 2007

Related U.S. Application Data

(60) Provisional application No. 60/711,403, filed on Aug. 25, 2005.

(51) Int. Cl.
*B32B 37/00* (2006.01)

(52) U.S. Cl. ............ 156/574; 156/577; 156/580; 156/582

(58) Field of Classification Search ............ 156/71, 156/486, 488, 574, 577, 580, 582, 583.1
See application file for complete search history.

(56) References Cited

U.S. PATENT DOCUMENTS

| | | | |
|---|---|---|---|
| 4,601,775 A | * | 7/1986 | Grone ............ 156/523 |
| 4,867,834 A | | 9/1989 | Alenskis et al. |
| 4,869,774 A | | 9/1989 | Wisbey |
| 5,045,147 A | | 9/1991 | Benson et al. |
| 5,110,395 A | | 5/1992 | Vaniglia |
| 5,290,389 A | | 3/1994 | Shupe et al. |
| 5,454,897 A | | 10/1995 | Vaniglia |
| 6,105,648 A | * | 8/2000 | De Graaf et al. ............ 156/421 |
| 6,390,169 B1 | | 5/2002 | Johnson |
| 2005/0236735 A1 | | 10/2005 | Oldani et al. |

* cited by examiner

*Primary Examiner*—James Sells
(74) *Attorney, Agent, or Firm*—Reinhart Boerner Van Deuren P.C.

(57) ABSTRACT

Tools for compacting composite parts are disclosed. These tools are used while layers of composite material, such as tows or laminae, are being deposited onto a fabricating surface, such as a mold or other forming tool. The compacting tool is typically divided into a series of narrow segments, each segment able to advance or retreat individually so as to conform to the surface of a composite part being formed. Pressurized fluid, such as air or hydraulic fluid, or non-pressurized internal bladders with incompressible fluid, are used to evenly apply pressure to the segments in order to compact the material with which the tool and the segments are in contact. The compacting tool thus helps eliminate voids and helps the material conform to the desired shape on the forming tool.

28 Claims, 11 Drawing Sheets

COMPACTION ROLLER FOR A FIBER PLACEMENT MACHINE

This patent application claims the benefit of the filing date under 35 U.S.C. §119(e) of U.S. Provisional Patent Application No. 60/711,403, filed Aug. 25, 2005, which is hereby incorporated by reference in its entirety.

FIELD OF THE INVENTION

This invention relates to the forming of composite structures with automated fiber placement machines, and more particularly to compaction rollers of fiber placement heads in automated fiber placement machines.

BACKGROUND OF THE INVENTION

Automated fiber placement machines are widely used to manufacture parts, components and structures from composite material. The materials used in automated fiber placement are typically composed of longitudinal fibers and resin consolidated into tapes, or thin strips, commonly known as "tows." Individual tapes or tows are manipulated by the fiber placement machine to form a band of material that is deposited onto a tool. Parts are built up layer-by-layer, with tapes or tows of composite material. The angle at which each layer or "ply" is laid onto the tool is precisely determined by the fiber placement machine.

Automated fiber placement enables the construction of complex composite structures having steered or curvilinear fiber paths. This method of producing composite structures is more cost effective than manual methods. It provides an improved structural efficiency due to its ability to orient the fibers along local internal load paths, which potentially results in lighter structures and lower costs than in structures made by other production methods.

The tows of material are actually laid onto the surface of a tool or a composite part being formed by a fiber placement head. The fiber placement head includes a compaction roller for pressing the tows against the surface of the tool or the preceding layers of material forming the composite part. In one way of using compaction rollers, disclosed in U.S. Pat. No. 4,867,834, a plurality of outer wafers or rollers with a single diameter are used with sprung arms to apply compaction force to an article that is being filament wound. This technique does not help for parts lacking radial symmetry such as prismatic parts. U.S. Pat. No. 5,110,395 also discloses a fiber placement head and a tool for compacting the composite tows laid down. This tool include a compaction shoe with a single-diameter outer surface that is urged against the part being fabricated by several pistons and segmented cylinders within the compaction shoe. While this method is useful for radially-symmetric composite parts, such as oxygen bottles or motor housings, it would be difficult to apply even pressure to parts lacking this symmetry.

In one improvement on these methods, U.S. Pat. No. 4,869,774 discloses a compaction tool made from a plurality of discs or wafers, also with a single outer compaction surface. An inner bladder extends through each of the discs. One of the discs is fixed radially to the compaction tool, while the others are allowed to move independently up or down with respect to the compaction surface, in response to the contours of the part being fabricated and the pressure in the bladder. While this is an improvement, the single compaction surface does not allow the segments to move sufficiently freely to insure compaction in areas where there is a significant change in the diameter or dimension of the part being fabricated.

U.S. Pat. No. 5,454,897 also discloses externally-facing, segmented pressure members for compacting a part being fabricated. The presser tool includes a central segment that is fixed, with additional segments on each side of the center and a pressure bladder on each side. The segments have an outer low friction surface, an elastomeric compression layer, and an outer roller bearing that allows each segment to rotate independently. The central segment or segments are fixed, and are unable to move in or out with respect to the other segments. Thus, tools made according to this patent will not have freedom of movement at least in the central portion of the tool, and the corresponding portion of the part being compacted may not receive sufficient pressure to compact the material.

U.S. Pat. No. 6,390,169 also discloses a compaction apparatus with two internal pressurizing bladders and a plurality of external segments, each with an outer roller bearing and compaction surface. A pivoting shaft extends through the segments, which have cutouts that allow the segments to pivot on the shaft while allowing the individual segments to move in and out, except for the fixed central segment. The fixed segment limits the ability of the tool to conform to the part surface and compact the composite material.

It is desirable to provide an improved compaction roller for the fiber placement head of an automated fiber placement machine having a higher degree of compliance, with uniformly applied compaction force, than has heretofore been achievable with prior compaction roller designs. It is further desirable to provide an improved compaction roller in which the compaction force can be selectively modified over the length of the roller. It is also desirable to provide a compaction roller of simple straight-forward design and operation.

BRIEF SUMMARY OF THE INVENTION

A first embodiment of the invention is a tool for compacting an article made from composites. The tool includes a mounting bracket, a shaft supported on the mounting bracket, a plurality of segments arranged concentrically along a length of the shaft and driven by the shaft, each segment further comprising a bearing having an outer race and a flexible outer covering, and a first and a second bladder extending through apertures in the plurality of segments on either side of the shaft, wherein each of the plurality of segments is separately movable perpendicularly with respect to the shaft in response to a shape of the article and a pressure in the first or second bladder, for the roller to apply a relatively uniform pressure across the article.

Another embodiment is a tool for compacting a composite article. The tool includes a mounting bracket, a shaft having a plurality of bores and at least one transverse fluid pressure passage connected to each of the plurality of bores, mounted to the mounting bracket, and a plurality of segments arranged along a length of the shaft, each segment comprising a piston bore and a piston within the segment, and also comprising a bearing having an outer race and a flexible outer covering, wherein each of the pistons is movable within the piston bore and one of the plurality of bores in response to pressure in the fluid pressure passage, and wherein each of the plurality of segments is separately movable perpendicularly to the shaft in response to a contour of the composite article and movement of the piston within the segment.

Another embodiment is a tool for compacting an article made with a composite material. The tool includes a bracket for connecting to a fiber placement head, a shaft mounted on the bracket, and a plurality of deformable segments mounted along a length of the shaft, each segment having a generally flat cylindrical shape with an inner diameter and an outer diameter, and each segment also having a plurality of transverse mounting pins and a plurality of bores, wherein the plurality of transverse mounting pins of a first segment fits into the plurality of bores of a second, adjacent segment, and the transverse mounting pins of the second adjacent segment fit into the plurality of bores of a third, adjacent segment, and wherein an outer surface of each of the plurality of deformable segments is movable with respect to adjacent segments in response to movement of the tool and a contour of the composite material, for applying a relatively uniform pressure to compact the article.

Another aspect is a compacting tool for compacting composite materials. The tool includes a bracket, a first shaft fixedly mounted on the bracket, a second shaft rotatably mounted on the bracket and connected to a source of power, and a plurality of segments, each segment having a central portion with a first aperture and a second aperture, each of the central portions mounted on the first shaft via the first aperture and mounted to the second shaft via a keyway extending through the central portion and into the second shaft, each of the plurality of segments further comprising a roller beating and an outer flexible layer, wherein an outer profile of the plurality of segments may be configured by selecting a rotational orientation of the central portions, the keyway and the second shaft, so that the composite material is compacted with a relatively uniform pressure.

Another aspect of the invention is a compaction tool for compacting a composite article. The tool includes a bracket, a first shaft rotatably mounted on the bracket, a second shaft mounted on the bracket and having a plurality of piston bores and at least one transverse fluid pressure bore in communication with each of the piston bores, a plurality of segments mounted along a length of the second shaft, each segment comprising at least one piston, at least one reservoir for pressurized fluid in fluid communication with one of the plurality of piston bores, and an outer roller bearing, and a belt for mounting around the first shaft and the plurality of segments, wherein each of the plurality of segments is separately movable perpendicularly to the second shaft in response to a contour of the composite article and movement of the piston within the segment, to apply a relatively uniform pressure to the composite article across the belt.

Another aspect is a tool for compacting an article made from composite materials. The tool includes a bracket, a first shaft fixedly mounted on the bracket, the first shaft having a plurality of piston bores and at least one transverse fluid pressure bore in communication with each of the piston bores, a plurality of segments mounted along a length of the first shaft, each segment comprising at least one piston, at least one reservoir for pressurized fluid in fluid communication with one of the plurality of piston bores, and an outer roller bearing, a second shaft rotatably mounted on the bracket, and a flexible roller further comprising an internal wire reinforcement, said roller rotatably mounted to the bracket and in rolling contact with at least two of the plurality of segments, wherein the first shaft further comprises a connection to a source of pressurized fluid, and the first shaft is sealingly connected to each of the plurality of segments.

Various aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of embodiments of the present invention and, together with the description, serve to explain the principles of the invention. In the drawings.

While the invention will be described in connection with certain preferred embodiments, there is no intent to limit the invention to those embodiments. On the contrary, the intent is to cover all alternatives, modifications and equivalents as included within the spirit and scope of the invention as defined by the appended claims.

DETAILED DESCRIPTION OF THE PRESENTLY PREFERRED EMBODIMENTS

As mentioned above, it is very important to thoroughly compact a part made from composite materials and in particular from one or more laminae of composite material. These materials are typically, but not necessarily, made from continuous carbon fibers, or other fibers, in a matrix of an epoxy or other thermoset or thermoplastic resin. The tools in which or onto which the materials are deposited may be heated even while filament winding, lay-up or other deposition is taking place. Heating at a moderate temperature warms the materials and makes the resin more pliable and possibly more tacky, allowing for better consolidation of the material and more conformance to the tool. This helps to make a stronger part by insuring better contact between layers of material, to minimize voids in a fabricated part, and to minimize the size of any avoids that may remain afterwards.

Embodiments of the invention are principally in the form of a compaction roller made up of a series of thin cylindrical roller sections or segments that are joined together on a frame. Each segment has a movable and rotatable outer periphery, and each segment is movable by pressure bladders or pistons located within the segment. The bladders or pressurized areas are connected to one or more orifices by which pressure can be applied, to thereby urge the rollers to move in a direction toward a nip point and apply pressure at the nip point. By providing multiple orifices feeding the pistons of the various segments, the amount of compaction force being applied by a given segment, or group of segments attached to the same orifices, may be modified along the length of the compaction roller. Through the use of fluid pressure, applied within the compaction roller, the compaction roller may be firmly affixed to the remainder of the fiber placement head, rather than being supported on a movable structure having fluid cylinders for pressing the compaction roller against the tool or part being formed, at the nip point, as was required when utilizing prior compaction roller designs.

Figure 1:
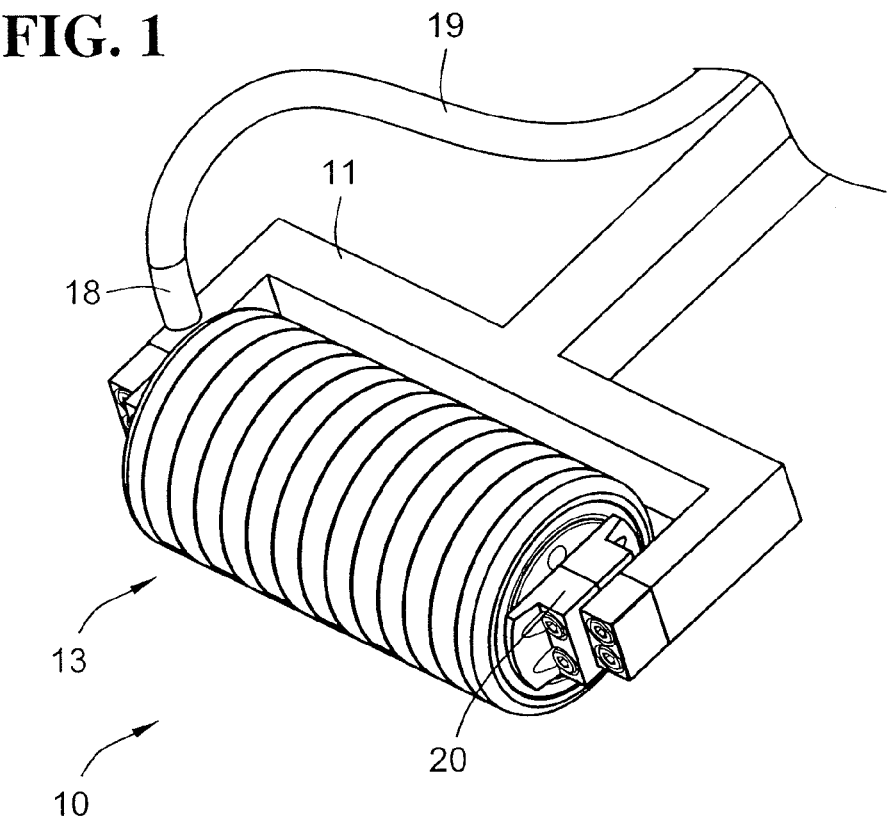
FIG. 1 is a perspective view of a first embodiment of a compacting tool.
Figure 2:
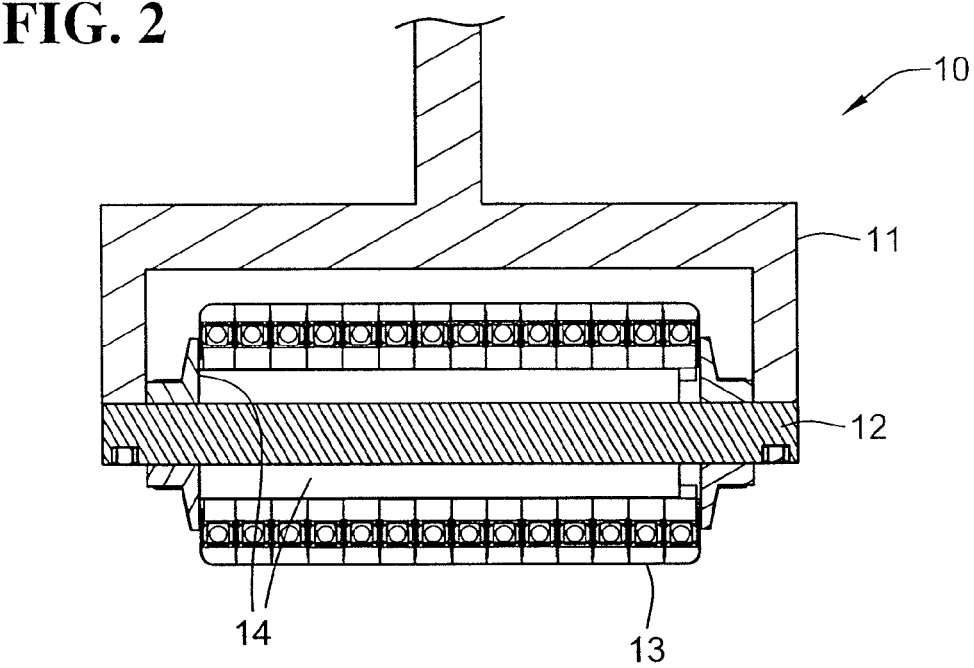
FIG. 2 is a cross-sectional view of the embodiment of FIG. 1.
Figure 3:
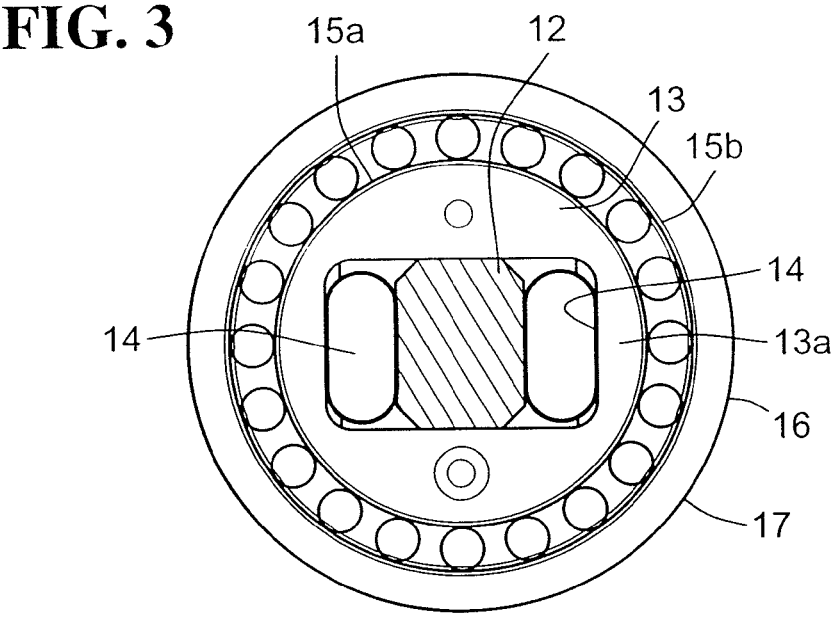
FIG. 3 is a cross-sectional view of a segment useful in embodiments of a compacting tool.

Using a compacting tool separately or while the tows of material themselves are being deposited can help with making stronger and better parts. One embodiment of a tool that may be used to compact parts while laying down tows of material is depicted in FIGS. 1-3. The tows (not shown) extend from a tape laying machine, such as those depicted in U.S. Pat. Appl. Publ. 2005/0236735 which is hereby incorporated by reference in its entirety. These tools are generally available from Ingersoll Machine Tools, Inc., Rockford, Ill. The tows extend from the tape laying machine to the compacting head, where they are brought into contact with the tool or the part being made. An embodiment of a compacting tool 10 includes a frame 11, a plurality of independently-movable segments 13, a fluid connector 18, and a fluid line 19 to a source of pressurized fluid.

A cross-sectional view of the compacting tool and an individual segment are shown in FIGS. 2-3. The tool 10 includes a relatively rigid shaft 12 that is mounted to the frame 11. The tool also includes two bladders 14 for filling with an incompressible fluid, such as hydraulic fluid or silicone gel. Alternatively, the bladders may be filled with air or other compressible fluid such as nitrogen, but an incompressible fluid is preferred. While the shaft is fixed, each segment 13 has a roughly rectangular internal void or space 13a to accommodate shaft 12 and bladder 14. The space allows each segment to move in and out on its own, thus compacting material in contact with its own periphery and without regard to the adjacent segments.

In addition to the internal space 13a, each segment preferably also includes a bearing 15, with an inner race 15a, outer race 15b, and roller elements between the inner and outer races. In addition to outer race 15b, each segment 13 preferably has a flexible outer covering 16 and preferably, an outer coating or layer 17 of a lubricious material, such as a polytetrafluoro-ethylene polymer, or other lubricious polymer. The bearings allow the outer race and flexible covering of each segment to freely rotate with respect to the remainder of the segment. The flexible covering is preferably an elastomer, such as polyurethane, although other elastomeric or plastic materials may be used, including thermoset and thermoplastic materials. Also preferred are silicone, nitrile, EPDM, and neoprene elastomers. If bladders 14 are not connected to an external source of pressure or fluid, the bladder should be filled with a non-compressible fluid, such as silicone gel or hydraulic fluid. In this or in other embodiments, the outer lubricious material may be a heat-shrink tubing, such as a plastic or elastomeric heat shrink tubing. Many materials are possible, such as PTFE-type materials, fluorinated ethylene propylene (FEP) materials, perfluoroalkoxy (PFA) materials, and many others.

Figure 4:
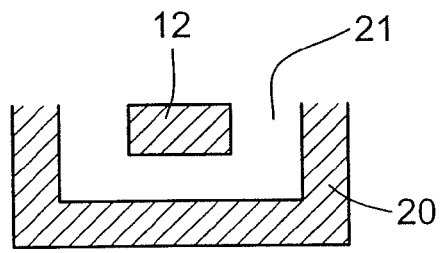
FIG. 4 is a cross-sectional view of an end cap useful for connecting the opposed pressure bladders of the first embodiment to make a second embodiment.

In another embodiment, the bladder 14 on each side of the shaft may be connected with an end cap, as shown in FIG. 4. End cap 20 includes a channel 21 for connecting the bladder on one side of shaft 12 with the bladder on the other side of shaft 12. When the part being made is consolidated using the compacting tool 10, the tape laying machine or other device brings the compacting tool into close contact with the tool or previous layers of material. If the tool or material is lower under one segment 13 of the tool than an adjacent segment, the segment will push forward out of line, and the pressure in the pressure bladder will attempt to move the segment backward into line. In a similar manner, if the tool or material is higher under one segment than an adjacent segment, the particular segment will be pushed backward out of the line, and the pressure in the pressure bladder will attempt to move the segment back into line. The segments are preferably as narrow as possible in order to achieve the greatest possible compaction in each segment. Although any width of segment may be used, segments are preferred with widths from about ⅛ inch wide to about 1 inch wide (about 3 mm to about 25 mm) and having an outer diameter from about 1 to about 3 inches (about 25 to about 75 mm). Other widths and diameter may be used for segments in this embodiment. The present embodiment uses 11 segments, although more or fewer segments may be used. Other embodiments may use these dimensions or other dimensions.

Figure 6:
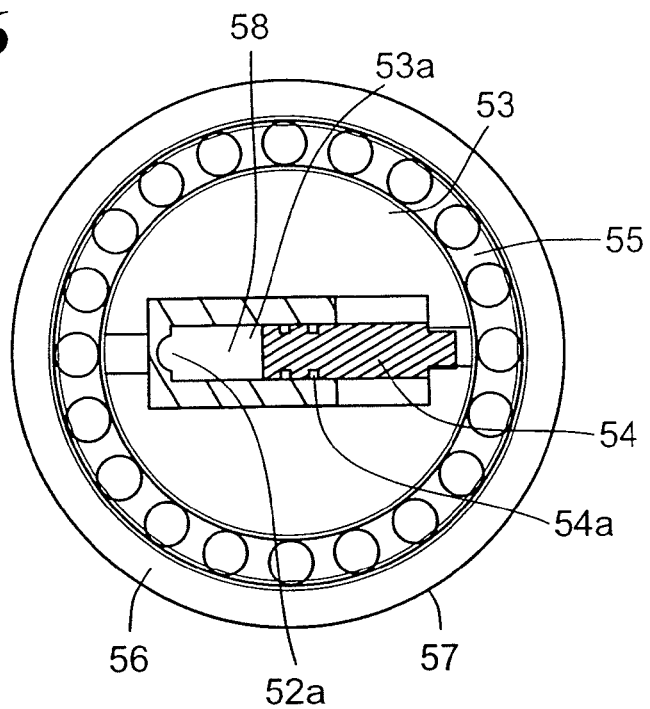
FIG. 6 is a cross-sectional view of a segment from the embodiment of FIG. 5.
Figure 5:
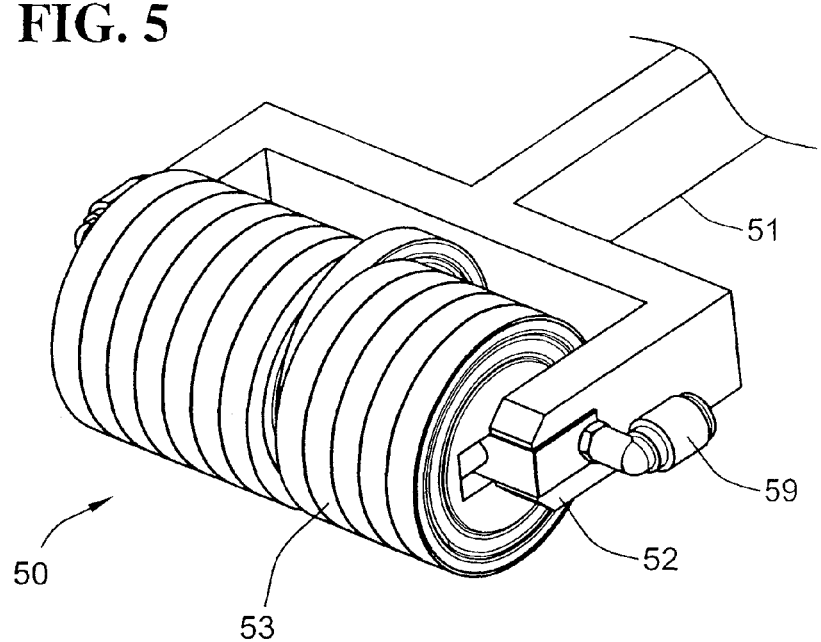
FIG. 5 is a perspective view of another embodiment of a compacting tool.
Figure 7:
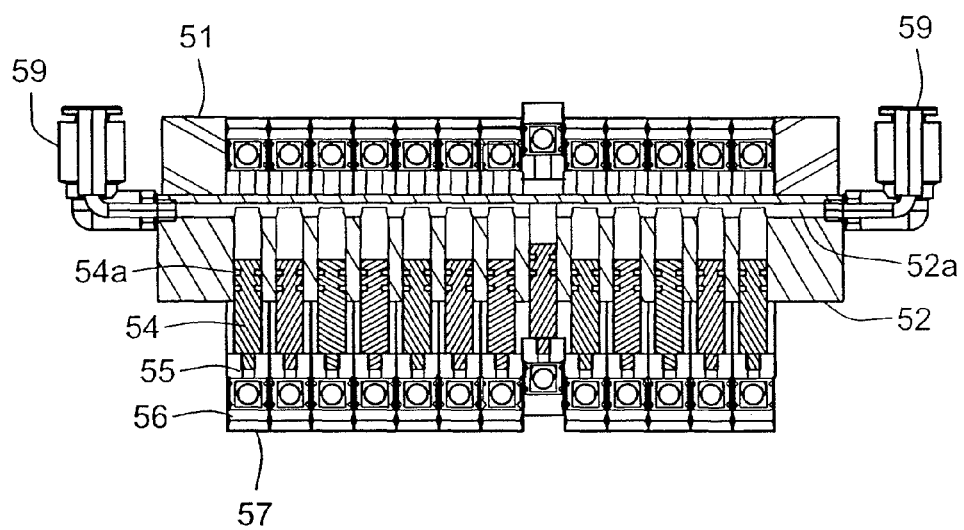
FIG. 7 is a cross-sectional view of a the embodiment of FIG. 5.
Figure 8:
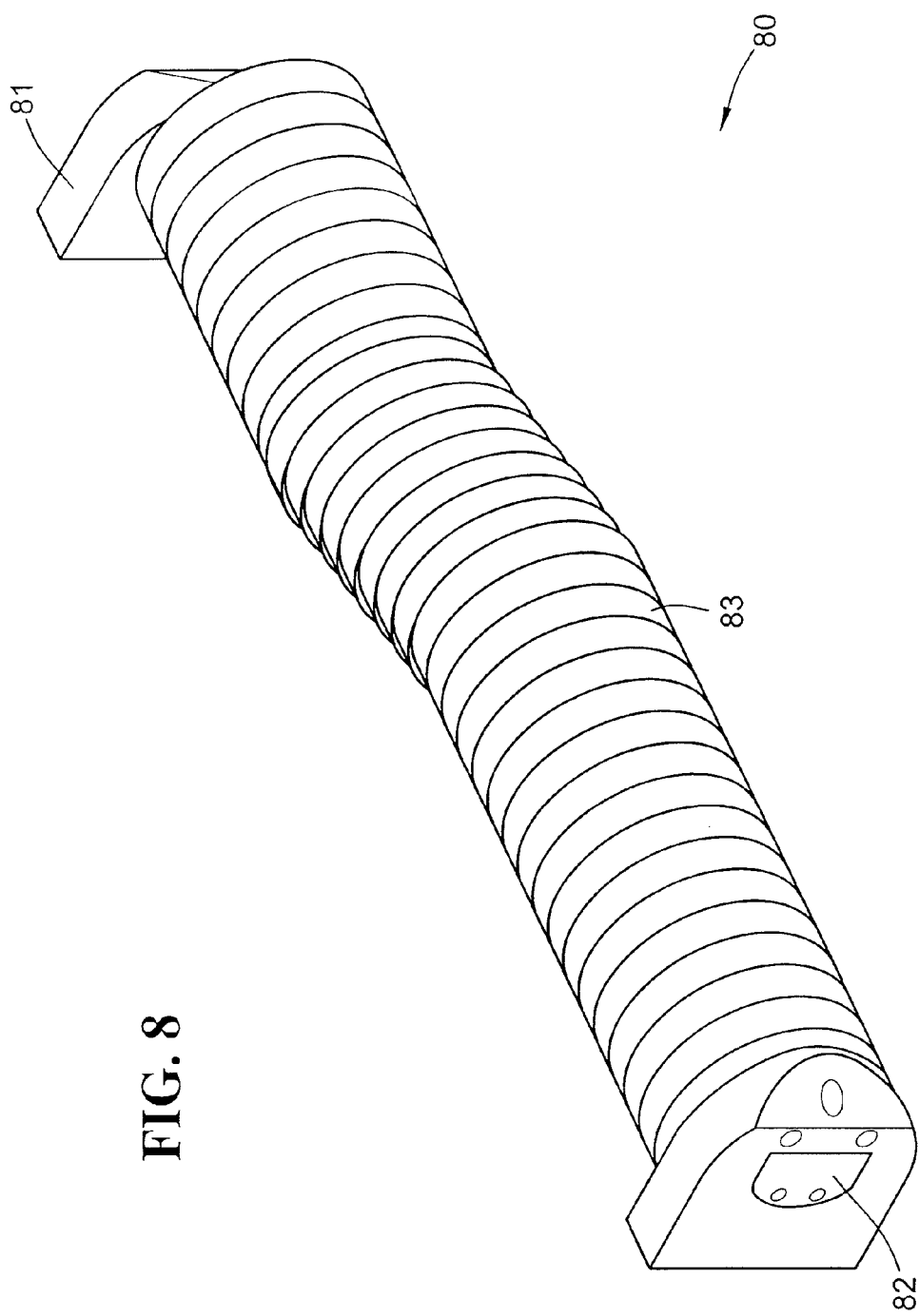
FIG. 8 is a perspective view of an additional embodiment of a compacting tool.

Other embodiments of a compacting tool may also be used, such as those using small pistons in the spaces in each segment, in addition to a pressurized fluid. FIGS. 5-7 depict another embodiment 50 of a compacting tool, which includes a frame 51, a central shaft 52, a plurality of compacting segments 53, and one or more connections 59 to a source of pressurizing fluid. As the user deposits tape or tows onto a tool, compaction tool 50 is used to consolidate layers, to squeeze out voids, and to make the best bonds possible between layers or tows of material. This embodiment has thirteen segments.

Each segment 53 includes a roughly rectangular-shaped central area 53a with spaces to accommodate the shaft 52 and transverse bore 52a to connect to a source of pressurized fluid. Each segment also includes a piston 54, and a fluid reservoir 58. Each piston resides within central area 53a and may be equipped with piston seals 54a. The pistons may be made of any appropriate material, such as steel, aluminum, or plastic. The seals may be made from any suitable material, such as elastomeric O-rings, or other relative soft, conforming elastomeric or plastic material. Each segment 53 may also include an outer bearing 55, each bearing preferably including inner and outer races, as shown, and roller elements. Each segment preferably has an outer flexible covering 56 and an outer lubricious film 57, such as one made from a PTFE-type polymer, or other lubricious film able to withstand the heat and stress of the application. Each segment may move in and out independently for best consolidating the material with which it is in contact. Using the pressurized fluid for motive force, each piston tends to move in or out in conformance with the material and local pressure in its area, thus consolidating the part that is being manufactured. Air or nitrogen are preferred if there is an external source of pressurizing fluid.

Another embodiment of a compaction roller is disclosed in FIGS. 8-12. Compaction roller 80 includes a mounting frame 81, a central shaft 82, and a plurality of roller segments 83.

Figure 9:
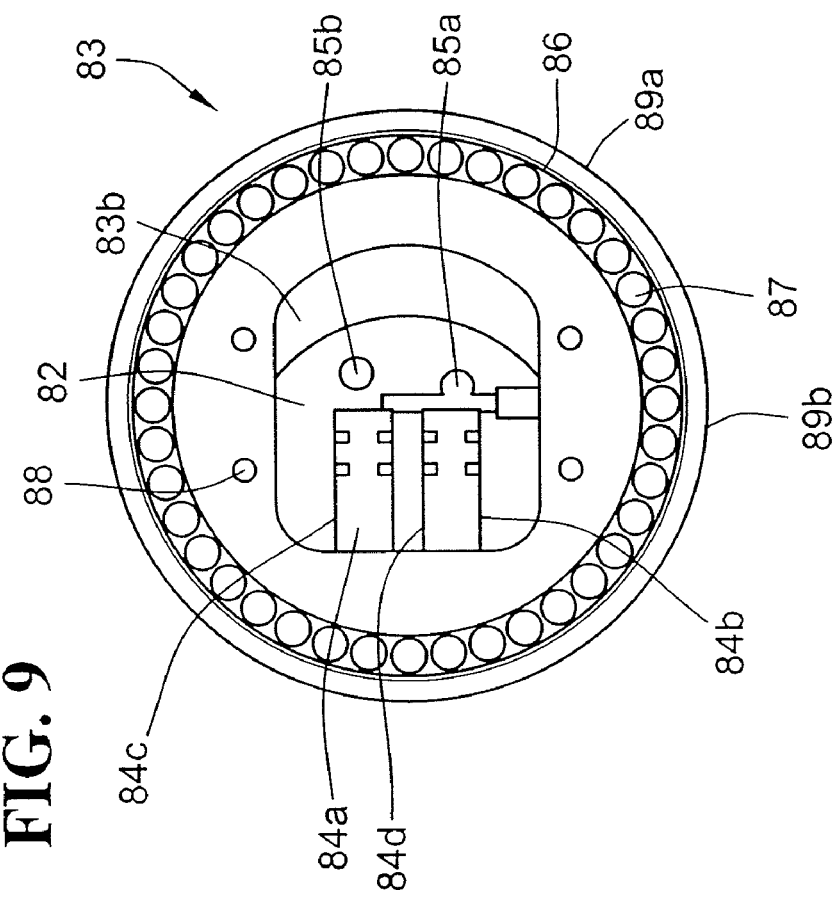
FIG. 9 is a cross-sectional view of a segment from the embodiment of FIG. 8.

Each roller segment is moveable in and out from the nominal periphery of the roller 80. A cross section of a roller segment 83 is seen in FIG. 9. Each roller segment 83 includes a central portion 83a with a void 83b for accommodating a portion of the shaft 82, and also spaces 84c, 84d for accommodating pistons 84a, 84b, and fluid in the space remaining. The central shaft may have at least two passageways 85a, 85b, one of which, 85a, is shown connecting to piston space 84d for transmitting fluid and fluid pressure. In one way of making central portion 83a, the central portions are cast, stamped or machined. The central portions 83a may be customized as shown, e.g., connecting one or other of the passages 85a, 85b to the central void 83b, by machining a path between the desired passage and the central void 83b, and then inserting a plug or set screw 87 to contain the fluid pressure.

Element 83 also has one or more apertures 88 for connecting adjacent segments using a pin in one segment and an aperture in the next. Each roller segment preferably also includes an outer roller bearing 86, preferably with an inner race, roller elements, and an outer race as shown. The outer race preferably includes an elastomeric coating or layer 89a and optionally an outer film or layer 89b of a lubricious material, such as a PTFE-type material. Other materials may be used. In general, segmented compacting tools should be able to maintain without leakage and with relatively uniform pressure, about a 1:10 ramp, segment height difference over width of several segments, while applying uniform, excellent compaction pressure. That is, if a compaction tool is made of ten segments, each about 10 mm (about 0.4 inches) wide, either center segment of the tool should be about to advance or retreat about 5 mm (about 0.2 inches) with respect to the end segment on that side. This would be a rise (or fall) of about 5 mm in a run (length) of about 50 mm (over 5 segments, each 10 mm wide). In inches, it would be a rise or fall of about 0.2 inches over a run of about 2 inches.

Figure 10:
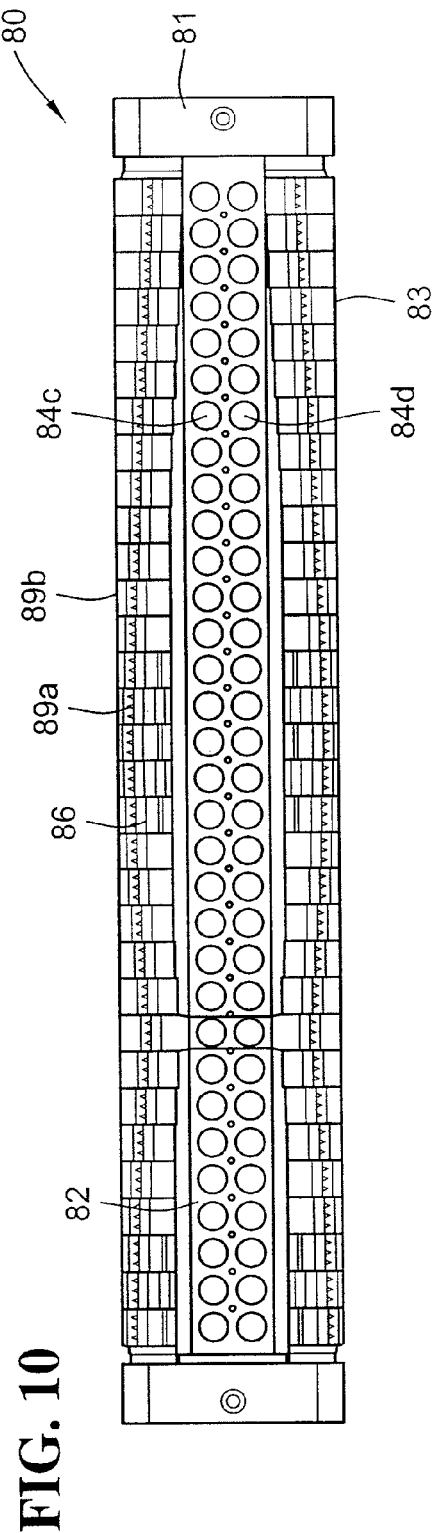
FIGS. 10-12 are additional cross-sectional views of the embodiment of FIG. 8.
Figure 11:
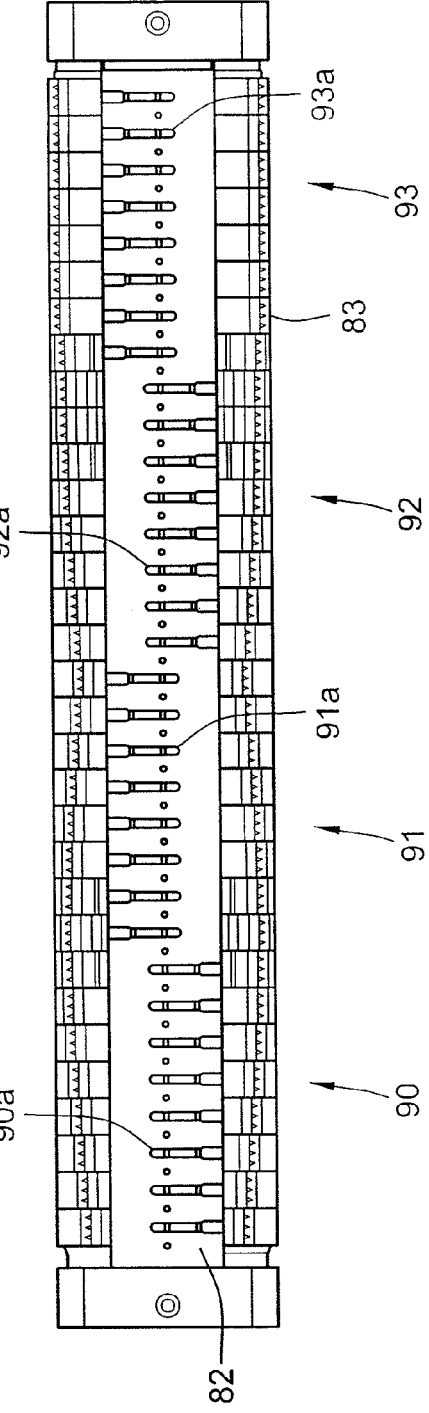
Figure 12:
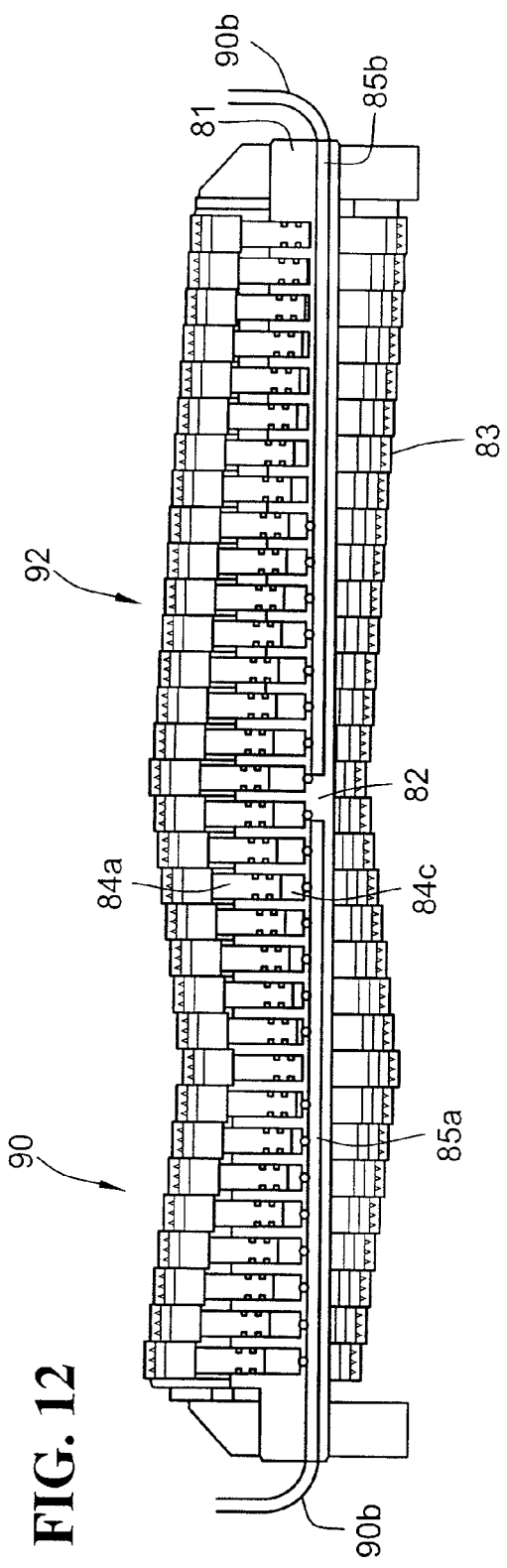

FIG. 10 depicts a cross section of roller 80, including frame 81, central shaft 82, and a plurality of roller segments 83. The roller segments include spaces 84c, 84d, for pistons and for fluid to apply pressure to the pistons. FIG. 11 depicts roller segments 83 divided into four series, 90, 91, 92, and 93 In this embodiment, each series includes 8 roller segments. FIGS. 11 and 12, also in cross section, depict fluid passage 85a connecting to spaces in a first series of roller segments 90, shown connecting with drilled passages 90a, and a source of pressurized fluid 90b. On the other side of the compaction roller, fluid passage 85b connects to spaces in a second series of roller segments 92, also shown connecting by drilled passages 92a and a second source of pressurized fluid 92b. The other series of roller segments, 91, 93, connect to sources of fluid pressure as desired with other fluid connections in the shaft. For example, there may be additional sources of pressurizing fluid, so that one series of roller segments may be pressurized to a higher pressure than the series. This may be useful, for example, when the compacting roller is longer than the part being consolidated or compacted, or when more pressure or less pressure is desired on one portion of the roller than the other portions.

Figure 14:
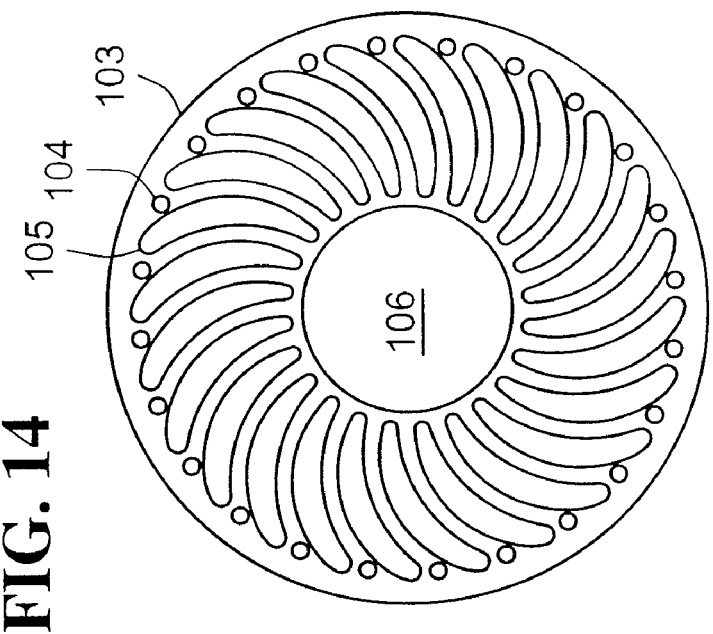
FIG. 14 is a cross-sectional view of a segment of the embodiment of FIG. 13.
Figure 13:
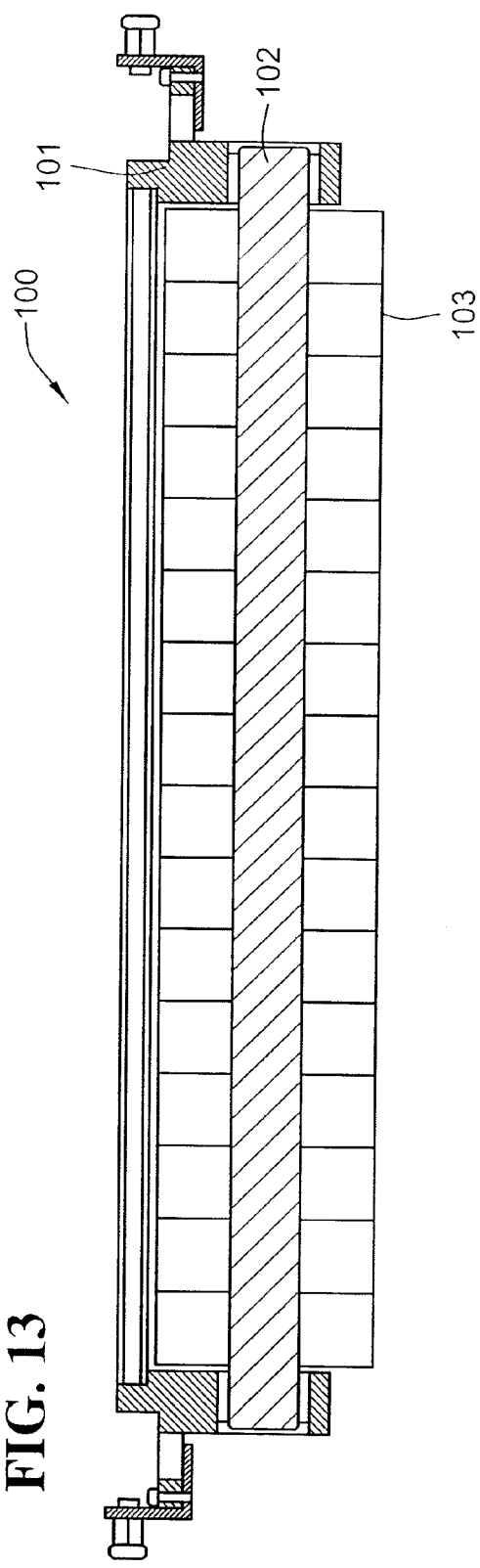
FIG. 13 is a cross-sectional view of another embodiment of a compacting tool.

Another embodiment of a compaction tool is disclosed in FIGS. 13-14. The compaction tool 100 includes a frame 101, a central shaft 102, and a plurality of roller segments 103. Each segment 103 is preferably made from a flexible, deformable material, such as plastic or an elastomer, such as polyurethane. The segment includes a space 106 for the central shaft, and also includes a plurality of small joining pins 104, and a series of spaces 105. Each of the pins 104 fits into a space 105 of an adjacent segment 103. The pins preferably extend at least about 0.040 inches (about 1 mm) above the surface of the roller segment for reliable connection to the adjacent roller segment. The pin diameter is preferably at least about 2 mm, but pins with other diameters may be used. While this embodiment does not use a pressurized bladder or pressurized fluid, the pins are an inexpensive way to add continuity between elements or segments while the deformable plastic or elastomeric material provides flexibility, and the tool as a whole is inexpensive and reliable. This embodiment also has the advantage of maintaining a relatively circular cross section under compaction. Because of the shape and placement of the spaces 105, additional pressure causes the segments to move radially inwardly, rather than extending in the cross-sectional direction. Materials preferred for this embodiment include elastomeric materials, such as polyurethane or silicone rubber compounds, and also plastic materials, which may be thermoplastic or thermoset materials. A hardness of the segments preferably may vary from about 20 to about 95 Shore D durometer.

Figure 15:
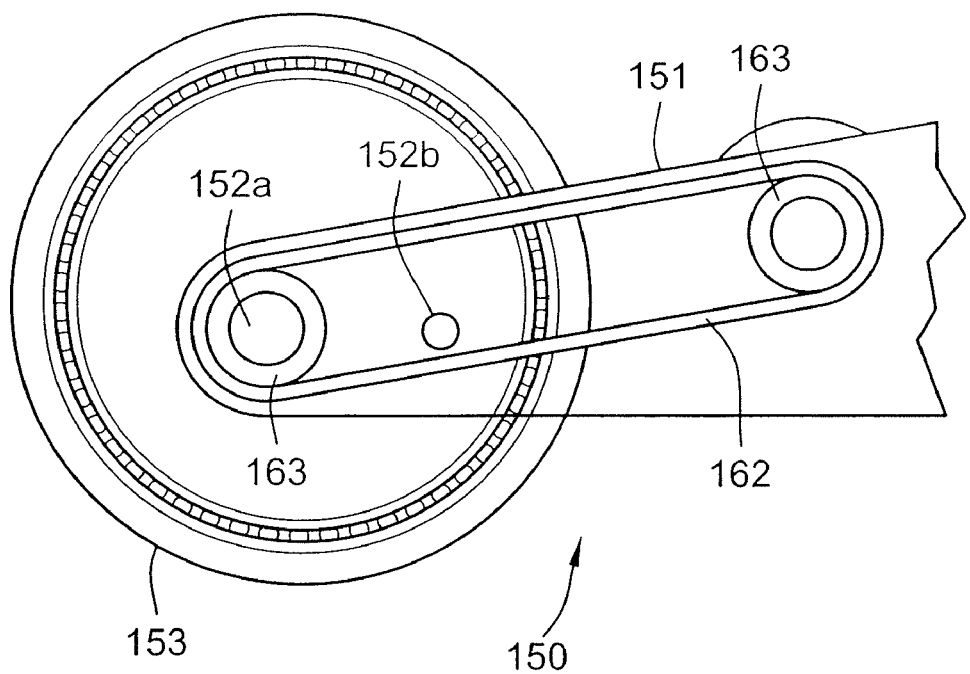
FIG. 15 is a side view of another embodiment of a compacting tool
Figure 16:
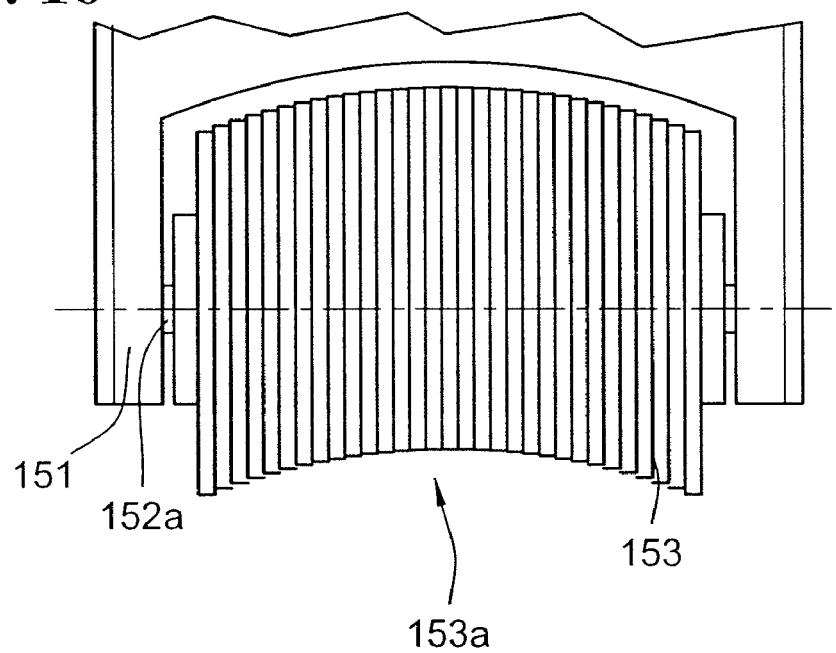
FIG. 16 is a cross-sectional view of the embodiment of FIG. 15.
Figure 17:
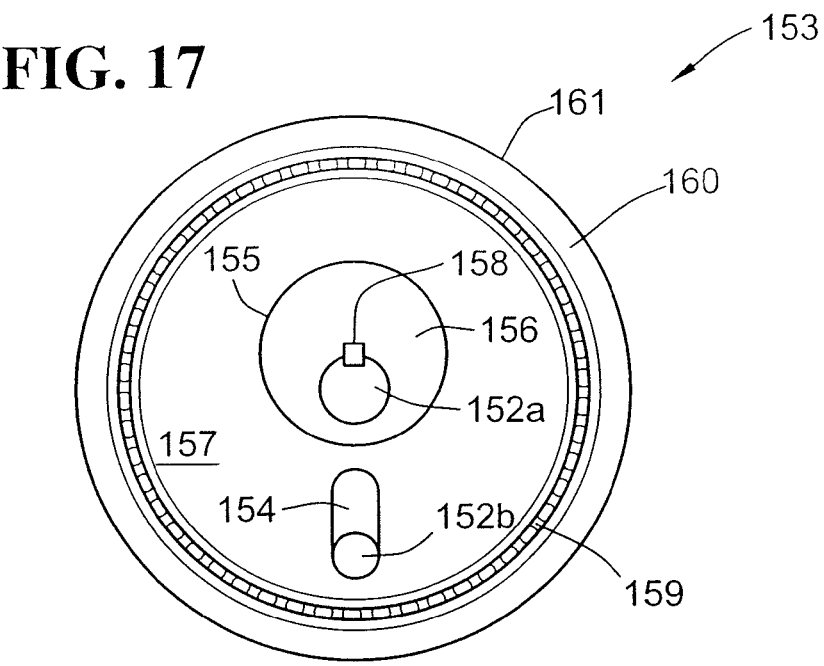
FIG. 17 is a cross sectional view of a segment from the embodiment of FIG. 15.

Yet another embodiment is depicted in FIGS. 15-17. Compaction tool 150 includes a frame 151, a positioning shaft 152a, a torque shaft 152b, and a plurality of segments 153. Each segment includes a central portion 157 with voids 154 and 155. The segments are arranged on shafts 152a, 152b, so that they form a desired profile 153a, such as a concave profile. The segments 153 each include central portion 157, inner spaces 154, 155, a disc 156, a roller bearing 159, a flexible covering 160, and preferably, an outer lubricious film or covering 161, such as a PTFE covering or shrink-tube covering. The first space 154 may be an elongated oval or rounded, generally rectangular space. The second space 155 is preferably circular in cross section, for accommodating positioning shaft 152a, disc 156, and a keyway 158, by which shaft 152a and discs 156 turn together.

The positioning shaft 152a may be rotated by a torque motor (not shown) or other power transmitted through belt 162, pulleys 163, and shaft 164. The outer races of the bearings can each rotate on their roller elements, compacting the part being manufactured while holding the desired profile, as the frame 151 is moved forward by the remainder of the compaction tool. FIG. 16 depicts a concave profile, but a linear profile or a convex profile may also be set. This particular embodiment holds the profile that is set by using two shafts, because the center portions 156 are not free to rotate, but are constrained by the torque shaft 152b and the keyway 158. While the profile or contour of the segments is fixed, the outer portions of bearing 159, flexible covering 160, and any outer sleeve 161, are free to rotate. Thus, compaction tool 150 may be set up or configured in a desired shape that is held until the tool is disassembled and re-configured, using discs 156, keyway 158, and positioning shaft 152. This tool will work exceptionally well for a part that is manufactured with a long, curved profile, such as a concave or convex profile. Tool 150 may also be configured with a straight profile or contour.

Figure 18:
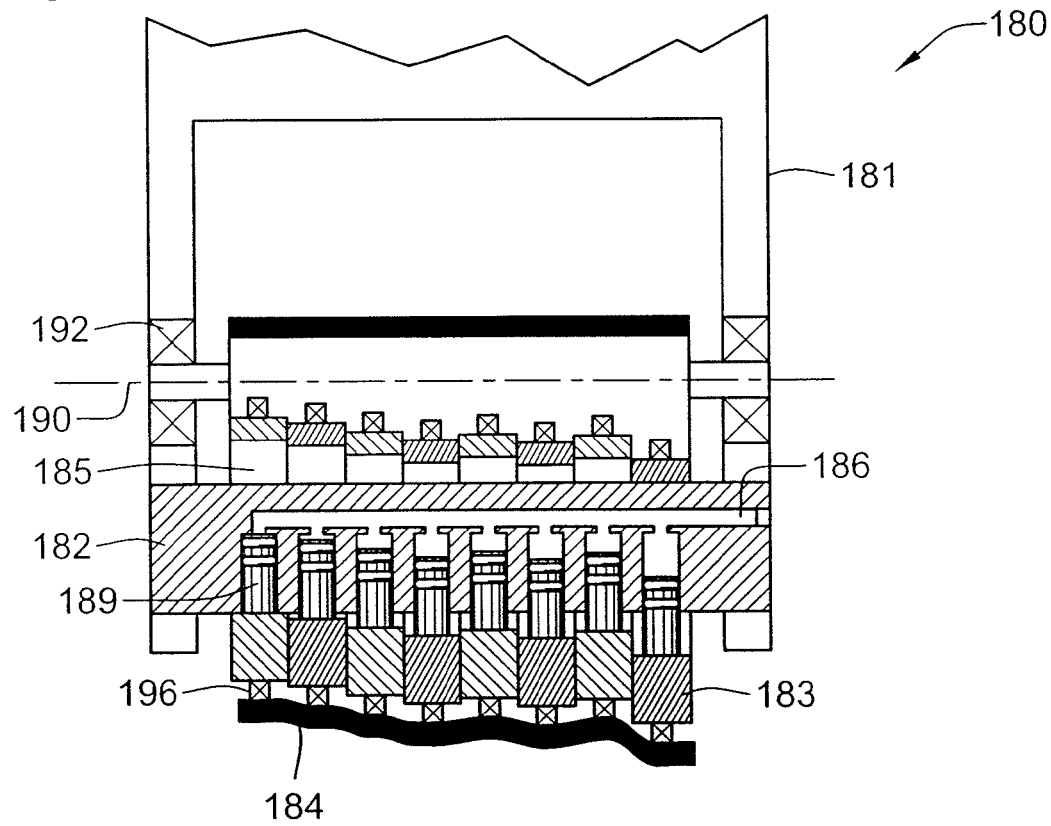
FIG. 18 is a cross section of another embodiment of a compacting tool.

Another compaction tool embodiment is also depicted in FIG. 18. Compaction tool 180 includes a frame 181, a central shaft 182, a plurality of roller segments 183, and an outer belt of covering 184, preferably made of a flexible elastomeric or plastic material. Each roller segment 183 includes space 185, a piston 189, and a roller bearing 196. The internal spaces 185 are connected to a source of pressurized fluid by a manifold 186 within shaft 182. There may also be a connection to a source of external pressure or pressurized fluid.

Figure 19:
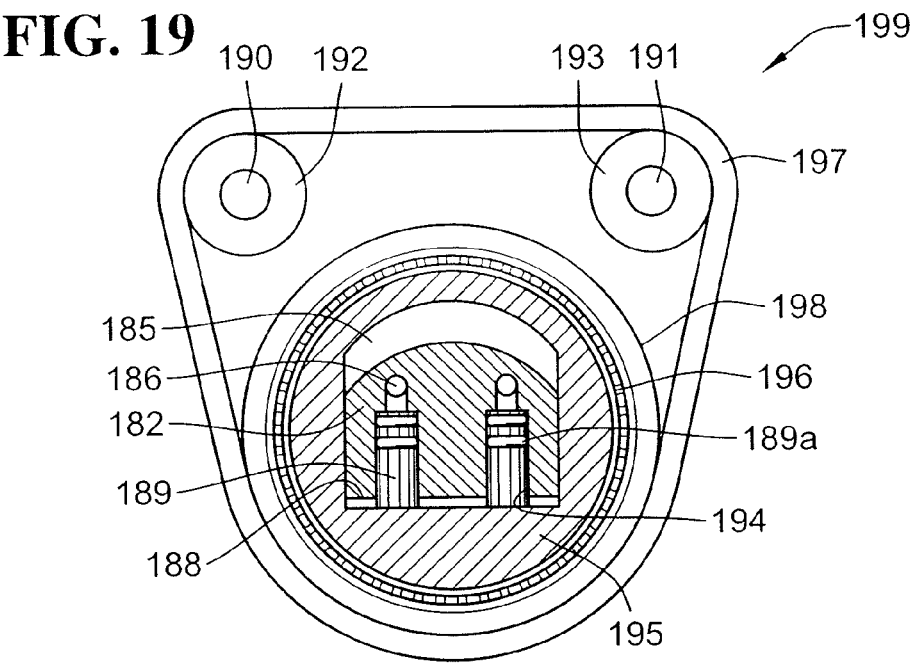
FIG. 19 is a cross section of another embodiment of a compacting tool.

A variation on this embodiment is shown in FIG. 19. While FIG. 18 has only a single shaft 190, the embodiment of FIG. 19 has two shafts, 190, 191, each with a bearing 192, 193 for easier rotation of the belt 197, which is suspended between shafts 190, 191, bearings 192, 193, and the plurality of roller segments 198. Each of the plurality of roller segments 198 includes first internal space 185, second internal space 194, and space for two pistons 189 with piston sealing elements 189a. Each segment also includes an outer bearing with an inner race 196 and an outer race 198, and roller elements between the races. Outer belt 197 is preferably flexible, and may be made from an elastomeric material, or may be made from a thermoplastic or thermoset material. Belt 197 may have an internal reinforcement to add to its stiffness, strength, or durability. The reinforcement may be a steel wire, such as a round or rectangular coil of wire embedded within the elastomeric, thermoplastic, or thermoset matrix of material. Alternatively, the matrix may be reinforced with short or long fibers, such as glass fibers, aramid fibers (such as Kevlar®), or polyester fibers. These belt materials may be used with the belts for the embodiments of FIGS. 18-19, and for FIG. 20. These materials may also be used for the outer flexible coating or covering for any of the other embodiments herein disclosed.

Figure 20:
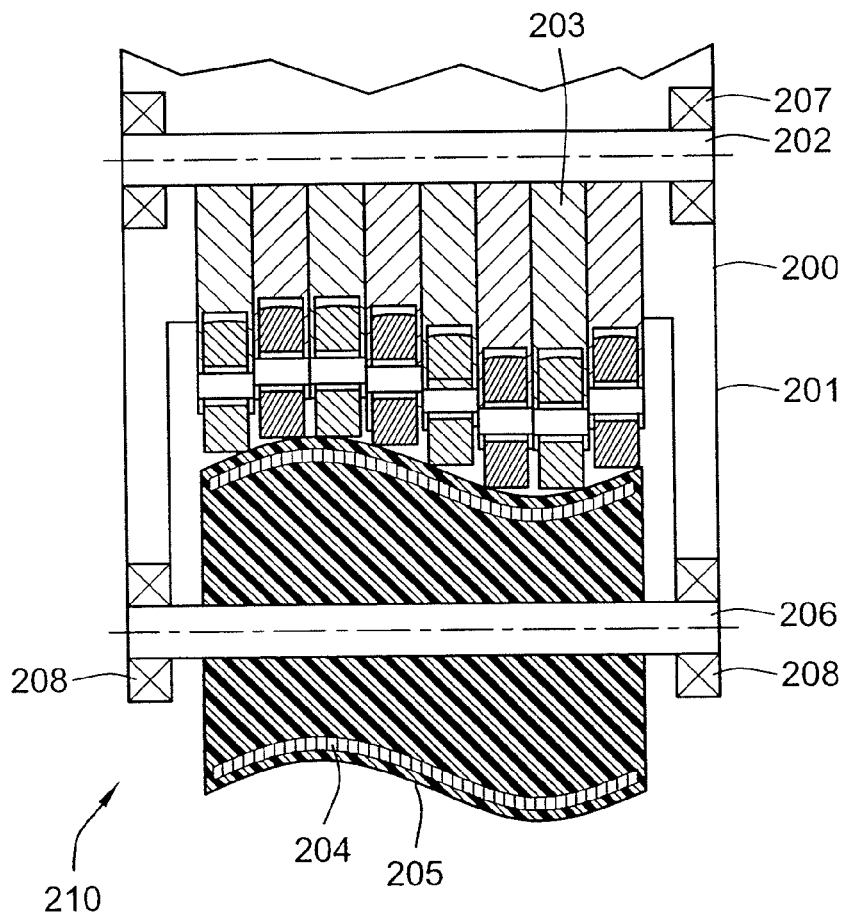
FIG. 20 is a cross sectional view of another embodiment of a compacting tool.

Another embodiment is depicted in FIG. 20. In this embodiment, the compaction tool 200 includes a frame 201, a first shaft 202, which may be mounted on bearings 207 or which may be rigidly fixed to frame 201. Mounted on shaft 202 are a plurality of roller segments 203, which may be any of the embodiments discussed above. Compacting member 210 is rotatably affixed to the tool 200 by a shaft 206 and bearings 208, which allow compacting member 210 to rotate on shaft 206. Compacting member 210 includes a reinforcing wire 204 embedded near the outer surface of an elastomeric roller 205. The elastomer is preferably polyurethane, although other elastomers, such as silicone, nitrile, EPDM, and neoprene, may be used instead. The reinforcing wire may include individual hoops of wire, preferably steel, although other metals may be used. In another embodiment, the reinforcing wire may be a continuous spiral of wire having many turns.

In making compacting member 210, it is preferred that all sides of each turn of the wire are immersed in the elastomer or plastic used. A preferred embodiment uses a continuous coil of flat wire, preferably about 0.5 mm (about 0.020 inches) thick and about 2 mm (about 0.080 inches) wide, oriented with the narrow portion (0.5 mm) facing the periphery. Wire of other configurations and dimensions may be used. Compacting tool 200 provides pressure from the rear-ward segments 203, while the forward compacting member 210 provides a continuous surface for consolidation of the part being manufactured. Compacting member 210 is preferably relatively stiff, maintaining its circular cross section under pressure, but is able to accommodate large variations in surface contour because of its composite construction.

Figure 21:
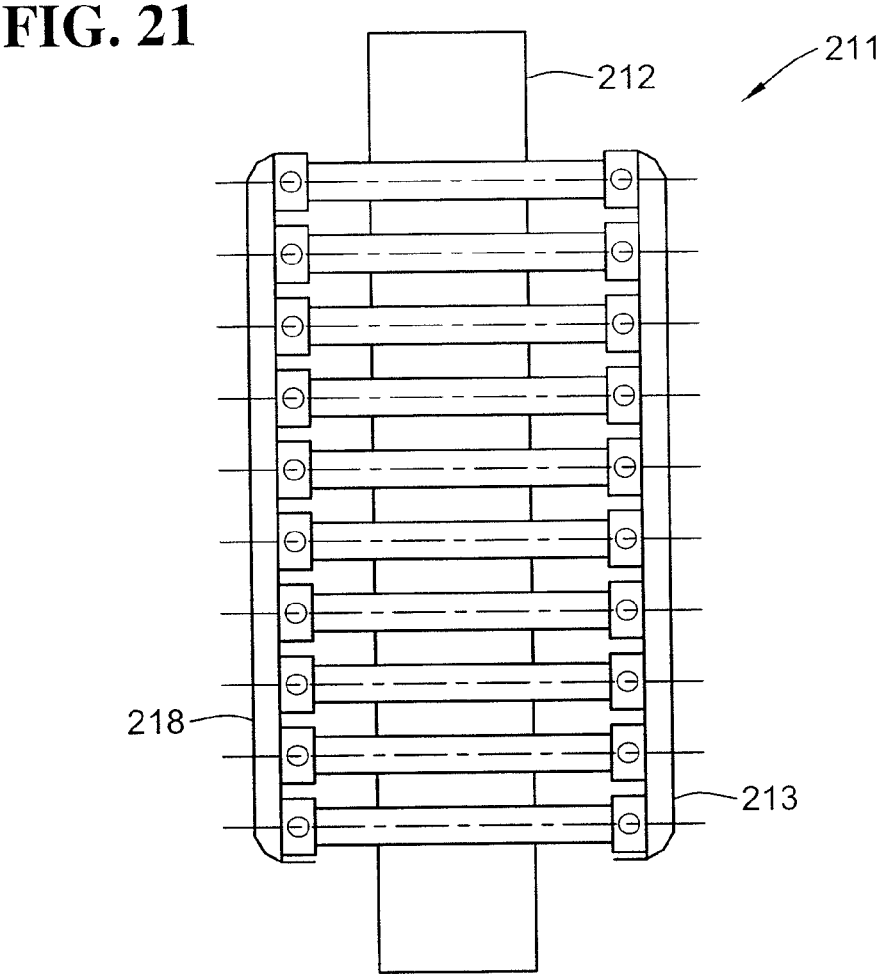
FIGS. 21-22 depict another embodiment of a compacting tool, using pins to limit travel of one segment away from another.
Figure 22:
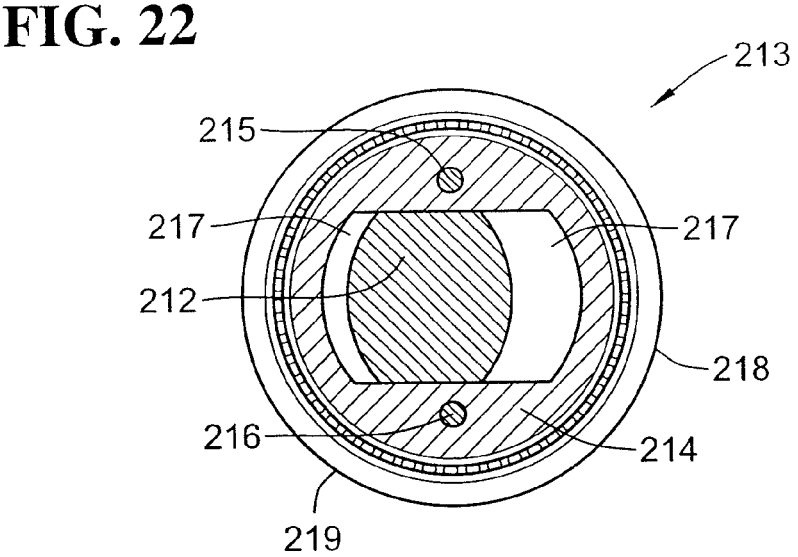

FIGS. 21-22 depict another embodiment of a compacting tool, an embodiment somewhat similar to that depicted in FIGS. 1-3. In the embodiment of FIGS. 21-22, a compacting tool 211 includes a central shaft 212, and a plurality of roller segments 213, each of which segments has an outer flexible or elastomeric coating 218. As best seen in cross-section in FIG. 22, each segment 213 includes a solid portion 214, with space for the shaft 212 and two non-connected reservoirs 217 for an incompressible fluid, such as silicone gel or hydraulic fluid. Silicone gel is preferred. Each portion 214 also includes a pin 215 on one side and a bore 216 on an opposite side. The pin preferably extends about 1/16 to 1/8 of an inch (about 1.5 to 3 mm) outward and has a diameter preferably about 2 mm, slightly less than the bore 216, so that the pin of one segment 214 fits easily into the bore of an adjacent segment when tool 211 is assembled. Other lengths of pins may be used to ensure connection of one segment to the next.

Internal portion 214 and shaft 212 define a pair of oppositely positioned internal cavities extending commonly through all of the segments for passage therethrough of a flexible fluid-tight containers 217 holding a substantially incompressible liquid or gel. The compaction tool is thus configured for restrained movement of the segments toward and away from a nip point or nip surface on the material or part being compacted.

The two fluid tight containers are not interconnected in fluid communication with one another. As an individual segment moves away from the nip point, or contact with the part under consolidation, under the compaction force applied to that particular segment, the liquid or gel is transferred laterally through the bladder passing through all of the roller segments on that side. Because the liquid or gel is substantially incompressible, a constant pressure is thus maintained throughout the chambers holding the liquid or gel, and a constant compaction force is applied by each of the individual segments. Adjacent segments are also operatively joined to one another by the series of pins and bores, with the bores being slightly larger in diameter than the pins, such that motion of one of the segments will trigger movement of the adjacent segments through interaction of the pin with the bore in an adjacent segment or vice versa.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tool for compacting an article made from composites, the tool comprising:
    a mounting bracket;
    a shaft supported on the mounting bracket;

a plurality of segments arranged concentrically along a length of the shaft and driven by the shaft, each segment further comprising a bearing having an outer race and a flexible outer covering; and a first and a second bladder extending through apertures in the plurality of segments on opposite sides of the shaft, wherein each of the plurality of segments is separately movable perpendicularly with respect to the shaft in response to a shape of the article and a pressure in the first or second bladder, for the roller to apply a relatively uniform pressure across the article.

2. The tool according to claim 1, wherein each of the plurality of segments further comprises a low friction outer sleeve.

3. The tool according to claim 1, wherein at least two of the plurality of segments have a bore and further comprising a pin placed into two the bores, linking the at least two segments.

4. The tool according to claim 1, further comprising at least one end cap for fluidly connecting the first and second bladders.

5. The tool according to claim 1, further comprising at least one connector for connecting at least one of the first and second bladders to a source of pressure.

6. The tool according to claim 1, wherein the bladders are designed for a fluid selected from the group consisting of an incompressible fluid, air or nitrogen.

7. A tool for compacting a composite article, the tool comprising:

a mounting bracket;

a shaft having a plurality of bores and at least one transverse fluid pressure passage connected to each of the plurality of bores, mounted to the mounting bracket;

a plurality of segments arranged along a length of the shaft, each segment comprising a piston bore and a piston within the segment, and also comprising a bearing having an outer race and a flexible outer covering, wherein each of the pistons is movable within the piston bore and one of the plurality of bores in response to pressure in the fluid pressure passage, and wherein each of the plurality of segments is separately movable perpendicularly to the shaft in response to a contour of the composite article and movement of the piston within the segment; and wherein the plurality of bores in the shaft comprises two pluralities of bores, side by side, and wherein each of the plurality of segments comprises two piston bores, and further comprising a piston in each of the two bores, each piston movable within one bore of the two pluralities of bores within the shaft.

8. The tool according to claim 7, further comprising an external source of pressurizing fluid, and a connector to the external source.

9. The tool according to claim 7, wherein each piston further comprises a fluid seal.

10. The tool according to claim 7, wherein the shaft and each of the plurality of segments is designed for pneumatic pressure.

11. The tool according to claim 7, wherein each of the plurality of segments further comprises an outer sleeve of lubricious material.

12. The tool according to claim 7, wherein the shaft further comprises at least two transverse fluid passages, at least one of the passages connected to a first portion of the plurality of segments, and at least one additional passage connected to a second portion of the plurality of segments.

13. The tool according to claim 7, wherein the shaft further comprises at least two transverse fluid passages, at least one of the passages connected to a first portion of the plurality of segments and also connected to a first external source of pressure, and at least one additional passage connected to a second portion of the plurality of segments and also connected to a second external source of pressure.

14. The tool according to claim 7, further comprising at least one reservoir for an incompressible fluid, the reservoir extending through each of the plurality of segments.

15. A tool for compacting an article made with a composite material, the tool comprising:

a bracket for connecting to a fiber placement head;

a shaft mounted on the bracket; and a plurality of deformable segments mounted along a length of the shaft, each segment having a generally flat cylindrical shape with an inner diameter and an outer diameter, and each segment also having a plurality of transverse mounting pins and a plurality of bores, wherein the plurality of transverse mounting pins of a first segment fits into the plurality of bores of a second, adjacent segment, and the transverse mounting pins of the second adjacent segment fit into the plurality of bores of a third, adjacent segment, and wherein an outer surface of each of the plurality of deformable segments is movable with respect to adjacent segments in response to movement of the tool and a contour of the composite material, for applying a relatively uniform pressure to compact the article.

16. The tool according to claim 15, wherein the tool further comprises an outer layer of lubricious material over the tool, or wherein each of the plurality of deformable segments further comprises an outer layer of lubricious material.

17. The tool according to claim 15, wherein each of the plurality of deformable segments comprises a thermoplastic or thermoset material, or an elastomer selected from the group consisting of urethane, silicone, nitrile, EPDM, and neoprene.

18. A tool for compacting composite materials, the tool comprising:

a bracket;

a first shaft fixedly mounted on the bracket;

a second shaft rotatably mounted on the bracket and connected to a source of power; and a plurality of segments, each segment having a central portion with a first aperture and a second aperture, each of the central portions mounted on the first shaft via the first aperture and mounted to the second shaft via a keyway extending through the central portion and into the second shaft, each of the plurality of segments further comprising a roller bearing and an outer flexible layer, wherein an outer profile of the plurality of segments may be configured by selecting a rotational orientation of the central portions, the keyway and the second shaft, so that the composite material is compacted with a relatively uniform pressure.

19. The tool of claim 18, wherein the first shaft and the second shaft are mounted eccentrically with respect to a center of the segments.

20. The tool of claim 18, wherein the second shaft is connected to a source of power by a power shaft mounted on the bracket.

21. A compaction tool for compacting a composite article, the tool comprising:

a bracket;

a first shaft rotatably mounted on the bracket;

a second shaft mounted on the bracket and having a plurality of piston bores and at least one transverse fluid pressure bore in communication with each of the piston bores;

a plurality of segments mounted along a length of the second shaft, each segment comprising at least one piston, at least one reservoir for pressurized fluid in fluid communication with one of the plurality of piston bores, and an outer roller bearing; and a belt for mounting around the first shaft and the plurality of segments, wherein each of the plurality of segments is separately movable perpendicularly to the second shaft in response to a contour of the composite article and movement of the piston within the segment, to apply a relatively uniform pressure to the composite article across the belt.

22. The compaction tool of claim 21, wherein each of the segments comprises first and second pistons and first and second reservoirs for pressurized fluid.

23. The compaction tool of claim 21, further comprising first and second bearings rotatably mounted on the bracket, and wherein the belt is also mounted around the first and second bearings.

24. The compaction tool of claim 21, wherein the belt comprises a wire reinforcement within an elastomeric or plastic matrix.

25. The compaction tool of claim 21, wherein the belt comprises a rectangular wire reinforcement within a polyurethane matrix.

26. A compaction tool for compacting an article made from composite materials, the tool comprising:

a bracket;

a first shaft fixedly mounted on the bracket, the first shaft having a plurality of piston bores and at least one transverse fluid pressure bore in communication with each of the piston bores;

a plurality of segments mounted along a length of the first shaft, each segment comprising at least one piston, at least one reservoir for pressurized fluid in fluid communication with one of the plurality of piston bores, and an outer roller bearing;

a second shaft rotatably mounted on the bracket; and a flexible roller further comprising an internal wire reinforcement, said roller rotatably mounted to the bracket and in rolling contact with at least two of the plurality of segments, wherein the first shaft further comprises a connection to a source of pressurized fluid, and the first shaft is sealingly connected to each of the plurality of segments.

27. The compaction tool of claim 26, wherein the flexible roller comprises a rectangular wire reinforcement within a polyurethane matrix.

28. The tool of claim 1, wherein the apertures includes a first set of apertures formed through each of the segments on a first side of the shaft having the first bladder extending through the first set of apertures and wherein the apertures includes a second set of apertures formed through each of the segments on a second side of the shaft having the second bladder extending through the second set of apertures, such that the first and second bladders are on opposite sides of the shaft.

* * * * *